United States Patent [19]

Sunday

[11] Patent Number: 4,678,379

[45] Date of Patent: Jul. 7, 1987

[54] APPARATUS FOR MACHINING A VALVE'S SEAT

[75] Inventor: Lester R. Sunday, Springfield, Pa.

[73] Assignee: Westinghouse Electric Corp., Pittsburgh, Pa.

[21] Appl. No.: 844,497

[22] Filed: Mar. 26, 1986

[51] Int. Cl.⁴ ............................................. B23B 41/00
[52] U.S. Cl. ............................... 408/83.5; 51/241 VS; 82/1.2; 408/54; 408/80
[58] Field of Search ................... 408/79, 80, 81, 83.5, 408/54, 708, 82, 83, 234, 241 R; 82/1.2, 1.4; 51/241 VS; 82/4 C

[56] References Cited

U.S. PATENT DOCUMENTS

| | | | |
|---|---|---|---|
| 413,697 | 10/1889 | Wheelock | 82/1.4 |
| 1,973,386 | 9/1934 | Morgan | 82/1.4 |
| 3,751,175 | 8/1973 | Brooks | 408/80 |
| 4,050,836 | 9/1977 | Anders | 82/1.4 |
| 4,571,129 | 2/1986 | Strand | 408/54 |

FOREIGN PATENT DOCUMENTS 466072  8/1975  U.S.S.R. ................................ 408/80

Primary Examiner—Gil Weidenfeld
Assistant Examiner—Daniel W. Howell
Attorney, Agent, or Firm—F. J. Baehr, Jr.

[57] ABSTRACT

Apparatus for machining a stop valve seat ring while the valve remains piped to a turbine comprises a pair of spiders with adjustable arms which fit within the valve and a shaft rotatably supported by the spiders and driven through a gear train by a motor attached to one of the spiders, the shaft having a tool support which holds and is capable of moving a single edge cutting tool axially to machine the seat ring.

1 Claim, 5 Drawing Figures

APPARATUS FOR MACHINING A VALVE'S SEAT

BACKGROUND OF THE INVENTION

This invention relates to an apparatus for machining valve seats and more particularly for apparatus for machining seats of large valves in the field.

Large stop valves for steam turbines are formed from forgings weighing hundreds of tons and repairing the seat ring within the valve when the valve is in place in the piping saves down time and the cost of removal of the valve for repair of the valve seat. In place repair consisted of welding and then hand grinding and lapping the seat rings.

SUMMARY OF THE INVENTION

In general, apparatus for machining a seat ring of a valve, when made in accordance with this invention, comprises a pair of spiders having a plurality of adjustable arms which extend outwardly to contact an inner wall of the valve, a shaft having an end rotatably disposed in each of the spiders so that it is axially aligned with the axis of the valve seat ring, means for rotating the shaft, a tool support affixed to the shaft at a location between the spiders. The tool support has means disposed thereon for holding a cutting tool and for moving the cutting tool axially with respect to the shaft.

BRIEF DESCRIPTION OF THE DRAWINGS

The objects and advantages of this invention will become more apparent by reading the following detailed description in conjunction with the accompanying drawings, in which.

DESCRIPTION OF THE PREFERRED EMBODIMENT

Figure 1:
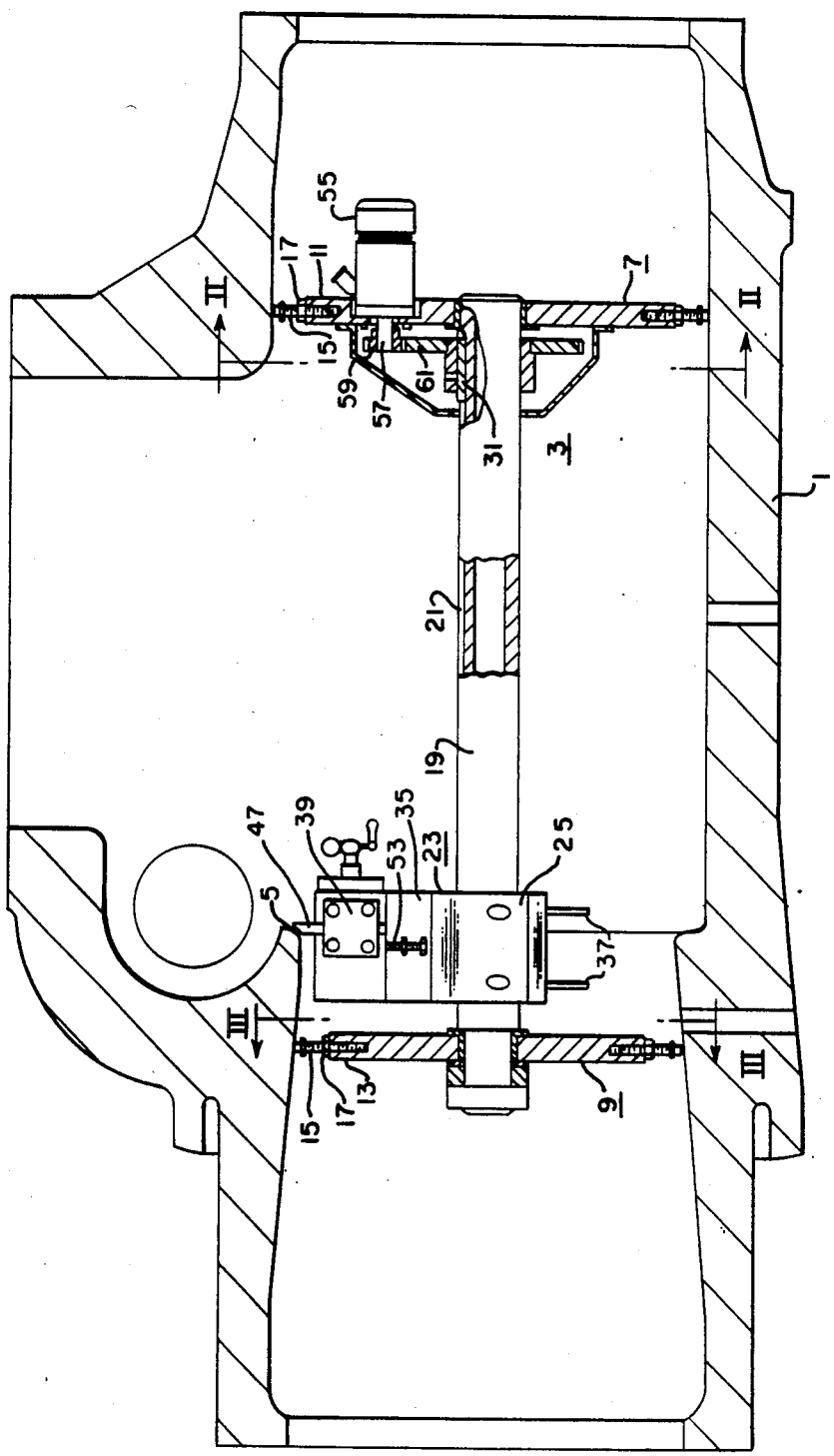
FIG. 1 is a sectional view of a stop valve showing an apparatus for machining the ring seat of the valve disposed within the valve.

Referring now to the drawings in detail and in particular to FIG. 1, there is shown a stop valve 1 for a steam turbine (not shown). Disposed in the stop valve 1 is shown apparatus 3 for machining a seat ring 5 in the valve.

The apparatus comprises a pair of spiders 7 and 9 having a plurality of adjustable arms 11 and 13 respectively, which extend radially outwardly to contact the inside wall of the valve 1.

Figure 2:
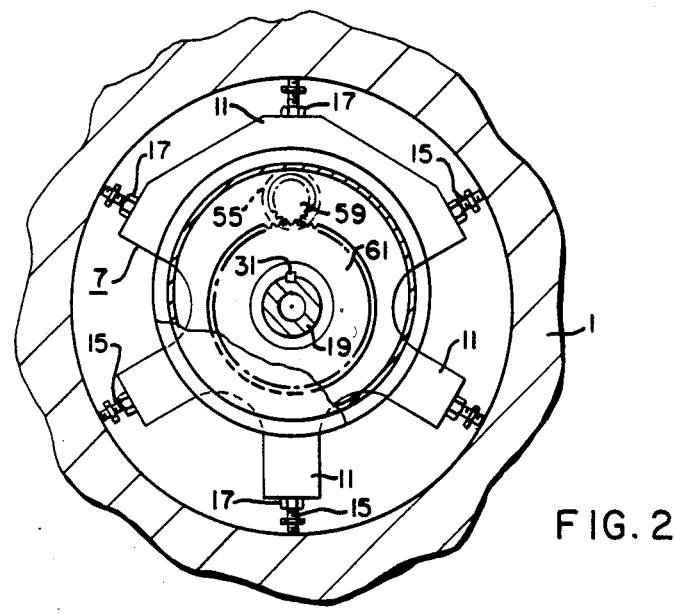
FIG. 2 is a partial sectional view taken on line II—II of FIG. 1.
Figure 3:
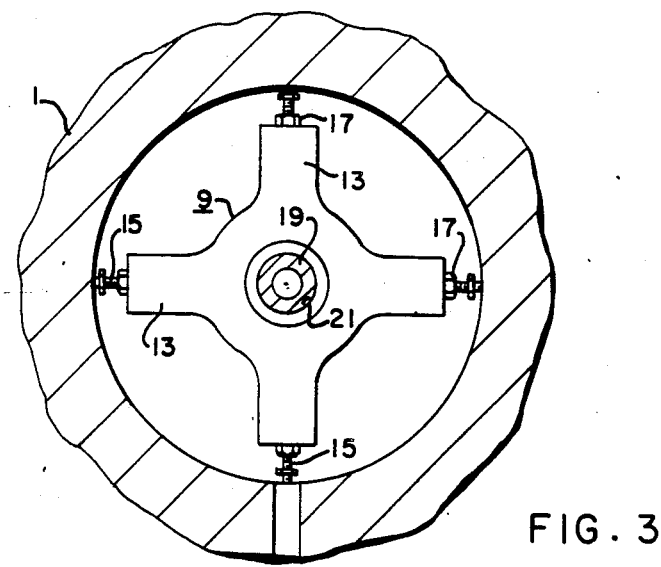
FIG. 3 is a partial sectional view taken on line III—III of FIG. 1.
Figure 4:
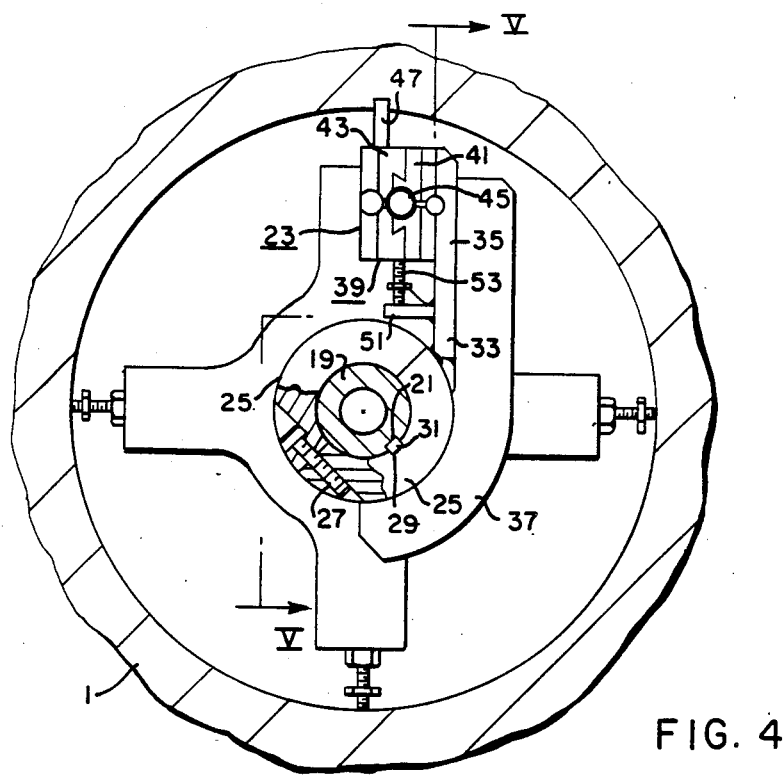
FIG. 4 is a partial sectional view of a tool holder.
Figure 5:
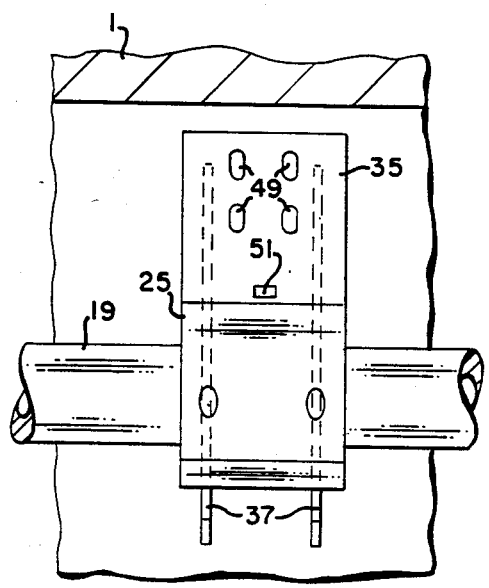
FIG. 5 is a partial sectional view taken on line V—V of FIG. 4.

As shown in FIG. 2, the spider 7 has six arms 11, the distal ends of which are adjustable threaded portions 15 which can be screwed in and out to adjust the position of the spider 7 within the valve 1. Lock nuts 17 lock the threaded portions 15 once the spider 7 is properly positioned. FIG. 3 shows the spider 9 has four arms 13, the distal ends of which also have adjustable threaded portions 15 which can be screwed in and out and locked by the nut 17 when the spider 9 is properly placed within the valve 1.

A shaft 19 has its ends rotatably disposed in the spiders 7 and 9 and is positioned by the spiders 7 and 9 so that the axis of the shaft 19 is coincident with the axis of the seat ring 5 in the valve 1. The shaft 19 also has a keyway 21 extending lengthwise over a large extent thereof and a tool support 23 is affixed to the shaft 19 so that it can be positioned generally at any desired location between the spiders 7 and 9.

THe tool support 23 comprises a horizontally split bored hub 25, whichis clamped on the shaft 19 by socket head cap screws 27. The hub 25 also has a keyway 29 which registers with the keyway 21 to receive a key 31 to prevent the hub 25 and tool support 23 from rotating with respect to the shaft 19. Exending from the periphery of the hub 25 is an arm 33 which is made up of a plate 35 which is disposed in a plane parallel to an axial radial plane and a pair of gussets 37 extending around a portion of the hub 25 and under the plate 35. Mounted on the distal end of the plate 35 is a tool holder 39 which has a base portion 41 which is bolted to the plate 35 and a slide portion 43 which is dove-tailed to the base and has a lead screw and handle 45 which move the slide portion 43 parallel to the axis of the shaft 19. A single edge cutting tool 47 is affixed to the slide portion 43 and is ground to the proper shape to machine the ring seat 5. Bolt holes 49 in the plate 35 through which the base portion is bolted are slotted and an angle bracket 51 is welded to the base plate and cooperates with a threaded stud 53 and the slotted holes to adjust the radial position of the tool holder 39.

To rotate the shaft 19, a motor 55 or other drive means is mounted on the spider 7 and has a rotatable shaft 57 on which is mounted a pinion gear 59 that engages a spur gear 61 keyed to the shaft 19 to provide means for rotating or driving the shaft 19 and the tool support 23 to machine the seat ring 5 of the valve 1 while the valve 1 is still piped to the turbine substantially reducing the downtime of the turbine and the expense of repairing the valve 1.

What is claimed is:

1. Apparatus for machining a seat ring of a valve, said apparatus comprising:

a pair of spiders having a plurality of adjustable arms which extend outwardly to contact an inner wall of said valve;

a shaft having an end rotatably disposed in each of said spiders so that the shaft is axially aligned with the axis of said valve seat ring and having a keyway extending lengthwise along its length;

means for rotating said shaft;

a tool support affixed to said shaft at any location between said spiders by a key and split hub which clamps said shaft;

said tool support having disposed thereon means for holding a cutting tool and for moving said cutting tool axially with respect to said shaft;

said cutting tool being a single edge cutting tool, having a cutting edge ground to cut the proper shaped seat ring; and said tool support having means for radially adjusting the means for holding the cutting tool and moving it axially with respect to the axis of the shaft to machine the seat ring of a valve.

* * * * *